(12) United States Patent
Miyamoto et al.

(10) Patent No.: US 6,966,299 B2
(45) Date of Patent: Nov. 22, 2005

(54) START CONTROL DEVICE AND START CONTROL METHOD FOR INTERNAL COMBUSTION ENGINE

(75) Inventors: Katsuhiko Miyamoto, Tokyo (JP); Hideo Nakai, Tokyo (JP); Seiji Shiota, Kawasaki (JP); Katsuyuki Maeda, Kawasaki (JP)

(73) Assignees: Mitsubishi Jidosha Kogyo Kabushiki Kaisha, (JP); Mitsubishi Jidosha Engineering Kabushiki Kaisha, (JP)

( * ) Notice: Subject to any disclaimer, the term of this patent is extended or adjusted under 35 U.S.C. 154(b) by 31 days.

(21) Appl. No.: 10/863,146

(22) Filed: Jun. 8, 2004

(65) Prior Publication Data

US 2004/0221834 A1 Nov. 11, 2004

Related U.S. Application Data

(63) Continuation of application No. PCT/JP03/10529, filed on Aug. 20, 2003.

(30) Foreign Application Priority Data

Aug. 20, 2002 (JP) .............................. 2002-238898

(51) Int. Cl.$^7$ .......................... F02P 5/145; F02D 41/06
(52) U.S. Cl. .......................... 123/406.45; 123/406.54; 123/406.59; 123/339.11; 123/339.24; 60/284
(58) Field of Search .................... 123/406.45, 406.54, 123/406.59, 339.11, 339.24; 60/284

(56) References Cited

U.S. PATENT DOCUMENTS

| | | | | |
|---|---|---|---|---|
| 5,492,094 A | * | 2/1996 | Cullen et al. | 123/339.11 |
| 5,950,419 A | * | 9/1999 | Nishimura et al. | 60/274 |
| 6,116,213 A | * | 9/2000 | Yasui et al. | 123/339.11 |
| 6,505,464 B1 | * | 1/2003 | Isobe et al. | 60/284 |
| 6,845,749 B2 | * | 1/2005 | Kubo | 123/339.11 |

FOREIGN PATENT DOCUMENTS

| | | |
|---|---|---|
| EP | 1 079 089 A2 | 2/2001 |
| EP | 1 193 382 A2 | 4/2002 |
| JP | 6-101456 A | 4/1994 |
| JP | 10-47039 A | 2/1998 |
| JP | 11-280518 A | 10/1999 |
| JP | 2001-90581 A | 4/2001 |
| JP | 2002-168168 A | 6/2002 |
| JP | 2002-174134 A | 6/2002 |
| JP | 2002-180943 A | 6/2002 |

* cited by examiner

*Primary Examiner*—Erick Solis
(74) *Attorney, Agent, or Firm*—Rossi, Kimms & McDowell, LLP

(57) ABSTRACT

An electronic control unit adjusts an electronic throttle valve to a starting opening in a cold start mode of an engine, then maintains the opening of the electronic throttle valve so that an engine rotational speed detected by a crank angle sensor increases to a target rotational speed, and increases the opening of the electronic throttle valve and retards an ignition timing if the engine rotational speed is increased above the target rotational speed.

12 Claims, 3 Drawing Sheets

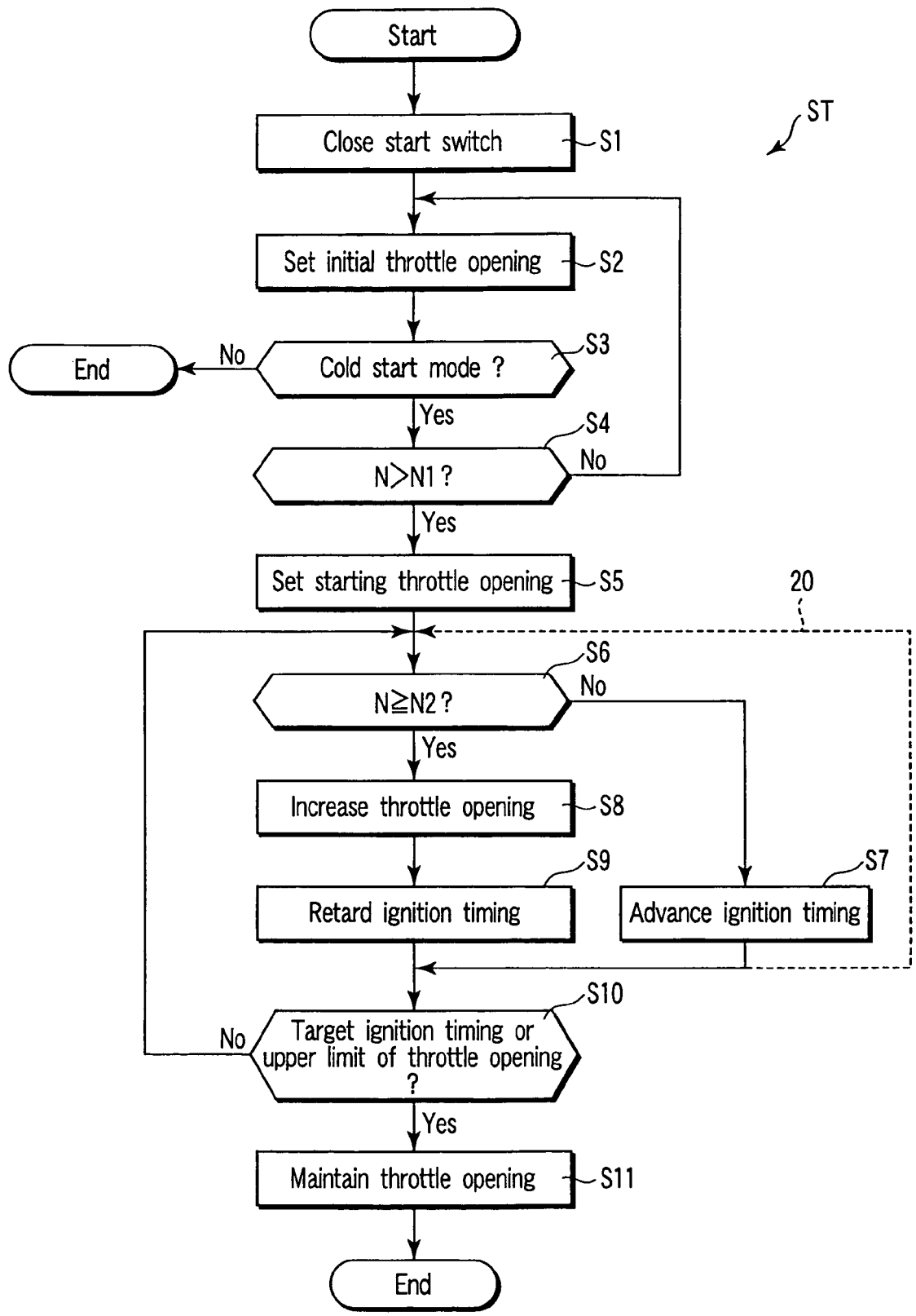
F I G. 2

START CONTROL DEVICE AND START CONTROL METHOD FOR INTERNAL COMBUSTION ENGINE

CROSS-REFERENCE TO RELATED APPLICATIONS

This is a Continuation Application of PCT Application No. PCT/JP03/10529, filed Aug. 20, 2003, which was not published under PCT Article 21(2) in English.

This application is based upon and claims the benefit of priority from prior Japanese Patent Application No. 2002-238898, filed Aug. 20, 2002, the entire contents of which are incorporated herein by reference.

BACKGROUND OF THE INVENTION

1. Field of the Invention

The present invention relates to an internal combustion engine provided with an exhaust gas purifying catalyst, and more specifically, to a start control device and a start control method, capable of ensuring early activation of the exhaust gas purifying catalyst by ignition timing retardation in a cold start mode and improved fuel combustibility.

2. Description of the Related Art

An air quantity control device for an internal combustion engine is described in Jpn. Pat. Appln. KOKAI Publication No. 6-101456. In this prior art example, a lag in the necessary ignition timing for early activation of a catalyst is calculated based on a driving condition of the engine, and the basic ignition timing is modified in accordance with this lag. Thereupon, the exhaust gas temperature increases, so that increase of the catalyst temperature is accelerated. At the same time, the quantity of intake air is increased for correction, depending on the opening of a throttle valve or the combination of the lag and the intake air quantity. Thus, the torque produced by an internal combustion engine can be kept at the same level as in the case where the ignition timing is not retarded.

In the prior art example described above, however, the opening of the throttle valve increases quickly in a cold start mode of the engine, so that the negative pressure in a intake pipe falls. If a fuel with relatively low volatility is used, therefore, it is more difficult for the fuel to evaporate. As a consequence, the air-fuel ratio temporarily becomes overlean, as indicated by broken line i in FIG. 3, so that combustion may possibly be destabilized. An internal combustion engine in which the air-fuel ratio is leaned out to ensure early increase of catalyst temperature, in particular, is considerably influenced by overleaning.

BRIEF SUMMARY OF THE INVENTION

The object of the present invention is to ensure early activation of an exhaust gas purifying catalyst and restrain temporary overleaning of the air-fuel ratio in a cold start mode of an engine.

A start control device for an internal combustion engine according to the present invention comprises engine rotational speed detecting means, ignition timing changing means, a valve mechanism which is set in a intake pipe and adjusts air intake, and control means, wherein the control means sets the valve opening of the valve mechanism to a starting opening in a cold start mode of the engine, then maintains the valve opening so that the engine rotational speed detected by the engine rotational speed detecting means increases to a target rotational speed, and increases the valve opening and causes the ignition timing changing means to retard the ignition timing when the engine rotational speed becomes higher than the target rotational speed.

According to this arrangement, the valve opening of the valve mechanism is restrained from increasing before the engine rotational speed reaches the target rotational speed in the cold start mode of the engine. Thus, the negative pressure in the intake pipe on the downstream side of the valve mechanism is relatively high. If a fuel of relatively low volatility is used, therefore, vaporization of the fuel is accelerated by the increased negative pressure in the intake pipe.

In consequence, overleaning of the air-fuel ratio can be prevented, and the stability of combustion can be ensured.

For example, the control means causes the ignition timing changing means to advance the ignition timing so that the engine rotational speed increases above the target rotational speed. According to this arrangement, increase of the rotational speed of the engine can be accelerated even if a fuel of relatively low volatility is used.

For example, the control means causes the ignition timing changing means to retard the ignition timing only during a period in which the rotational speed is increased above the target rotational speed. According to this arrangement, the ignition timing is retarded slowly. Even if a fuel of relatively low volatility is used, therefore, increase of the rotational speed of the engine can be accelerated as the ignition timing is retarded, so that the catalyst temperature can be increased earlier.

For example, the control means causes the ignition timing changing means to retard the ignition timing after increasing the valve opening if the engine rotational speed is increased above the target rotational speed in the cold start mode of the engine. According to this arrangement, the stability of combustion can be further improved.

For example, the control means first sets the valve opening to an initial opening in the cold start mode of the engine and then increases the valve opening to the starting opening if the engine rotational speed is increased above a start decision rotational speed. According to this arrangement, the negative pressure in the intake pipe on the downstream side of the valve mechanism increases, so that the vaporization of the fuel is accelerated. Thus, the startability of the engine can be enhanced by the satisfactory combustion of the fuel.

For example, the control means is provided with starting air-fuel ratio leaning means which leans out the air-fuel ratio at the start of operation of the engine. According to this arrangement, overleaning of the air-fuel ratio can be prevented more effectively, and the stability of combustion can be ensured.

A start control method for an internal combustion engine according to the present invention comprises control steps including an engine rotational speed detecting step of detecting the rotational speed of an engine, the ignition timing changing step of changing the ignition timing, and an air intake adjustment step of adjusting the air intake by means of a valve mechanism set in a intake pipe, the control steps including setting the valve opening of the valve mechanism to a starting opening in a cold start mode of the engine in the air intake adjustment step, then maintaining the valve opening so that the engine rotational speed detected in the engine rotational speed detecting step increases to a target rotational speed, and increasing the valve opening and retarding the ignition timing in the air intake adjustment step and the ignition timing changing step, respectively, when the engine rotational speed becomes higher than the target rotational speed.

According to this arrangement, the valve opening of the valve mechanism is restrained from increasing before the engine rotational speed reaches the target rotational speed in the cold start mode of the engine. Thus, the negative pressure in the intake pipe on the downstream side of the valve mechanism is relatively high. If a fuel of relatively low volatility is used, therefore, vaporization of the fuel is accelerated by the increased negative pressure in the intake pipe. In consequence, overleaning of the air-fuel ratio can be prevented, and the stability of combustion can be ensured.

For example, the control steps include advancing the ignition timing in the ignition timing changing step so that the engine rotational speed increases above the target rotational speed. According to this arrangement, increase of the rotational speed of the engine can be accelerated even if a fuel of relatively low volatility is used.

For example, the control steps include retarding the ignition timing in the ignition timing changing step only during a period in which the rotational speed is increased above the target rotational speed. According to this arrangement, the ignition timing is retarded slowly. Even if a fuel of relatively low volatility is used, therefore, increase of the rotational speed of the engine can be accelerated as the ignition timing is retarded, so that the catalyst temperature can be increased earlier.

For example, the control steps include retarding the ignition timing in the ignition timing changing step after increasing the valve opening in the air intake adjustment step if the engine rotational speed is increased above the target rotational speed in the cold start mode of the engine. According to this arrangement, the stability of combustion can be further improved.

For example, the control steps include first setting the valve opening to an initial opening in the cold start mode of the engine in the air intake adjustment step and then increasing the valve opening to the starting opening in the air intake adjustment step if the engine rotational speed is increased above a start decision rotational speed. According to this arrangement, the negative pressure in the intake pipe on the downstream side of the valve mechanism increases, so that the vaporization of the fuel is accelerated. Thus, the startability of the engine can be enhanced by the satisfactory combustion of the fuel.

For example, the control steps include a starting air-fuel ratio leaning means step of leaning out the air-fuel ratio at the start of operation of the engine. According to this arrangement, overleaning of the air-fuel ratio can be prevented more effectively, and the stability of combustion can be ensured.

BRIEF DESCRIPTION OF THE SEVERAL VIEWS OF THE DRAWING

FIG. 2 is a flow chart for illustrating a control method for the internal combustion engine shown in FIG. 1.

DETAILED DESCRIPTION OF THE INVENTION

An embodiment of the present invention will now be described with reference to the drawings.

Figure 1:
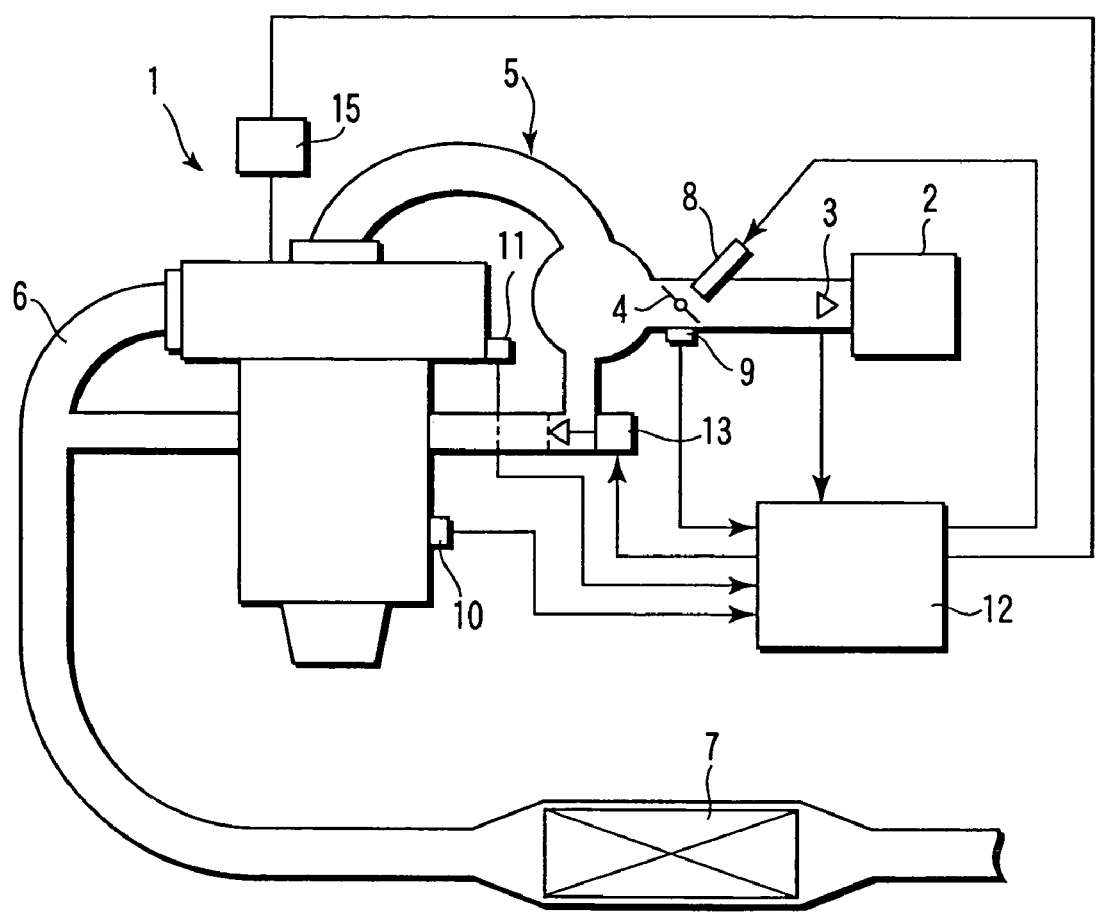
FIG. 1 is a side view of a part of an internal combustion engine typically showing an embodiment of the present invention.

FIG. 1 shows a multi-cylinder engine 1 of the cylinder-injection type (for cylinder injection of fuel). In this engine 1, the flow rate of intake air that is introduced through an air cleaner 2 on the upstream side of a intake pipe 5 is measured by means of an air flowmeter 3. The measured intake air is guided into a surge tank or an inlet manifold, for use as the downstream-side intake pipe 5, through an electronic throttle valve 4 that is opened and closed by means of a step motor or the like. Further, this intake air flows into cylinders (not shown) and burns a cylinder injection fuel. Exhaust gas from the cylinders is discharged from an exhaust manifold 6 into the atmosphere via an exhaust gas purifying catalyst 7.

A starting fuel injection valve 8 is located on the upstream side of the electronic throttle valve 4. Detection signals from the air flowmeter 3, a throttle position sensor 9, a crank angle sensor 10, a cooling water temperature sensor 11, etc., are applied to the input of an electronic control unit 12, which operates the engine 1. The electronic control unit 12, which functions as control means, controls the respective actions of the starting fuel injection valve 8, a fuel injection valve (not shown), ignition timing changing means 15 for an ignition coil, an EGR (Exhaust Gas Recirculation) valve 13, etc. The fuel injection valve is located so as to inject the fuel into the combustion chamber of each cylinder.

Figure 3:
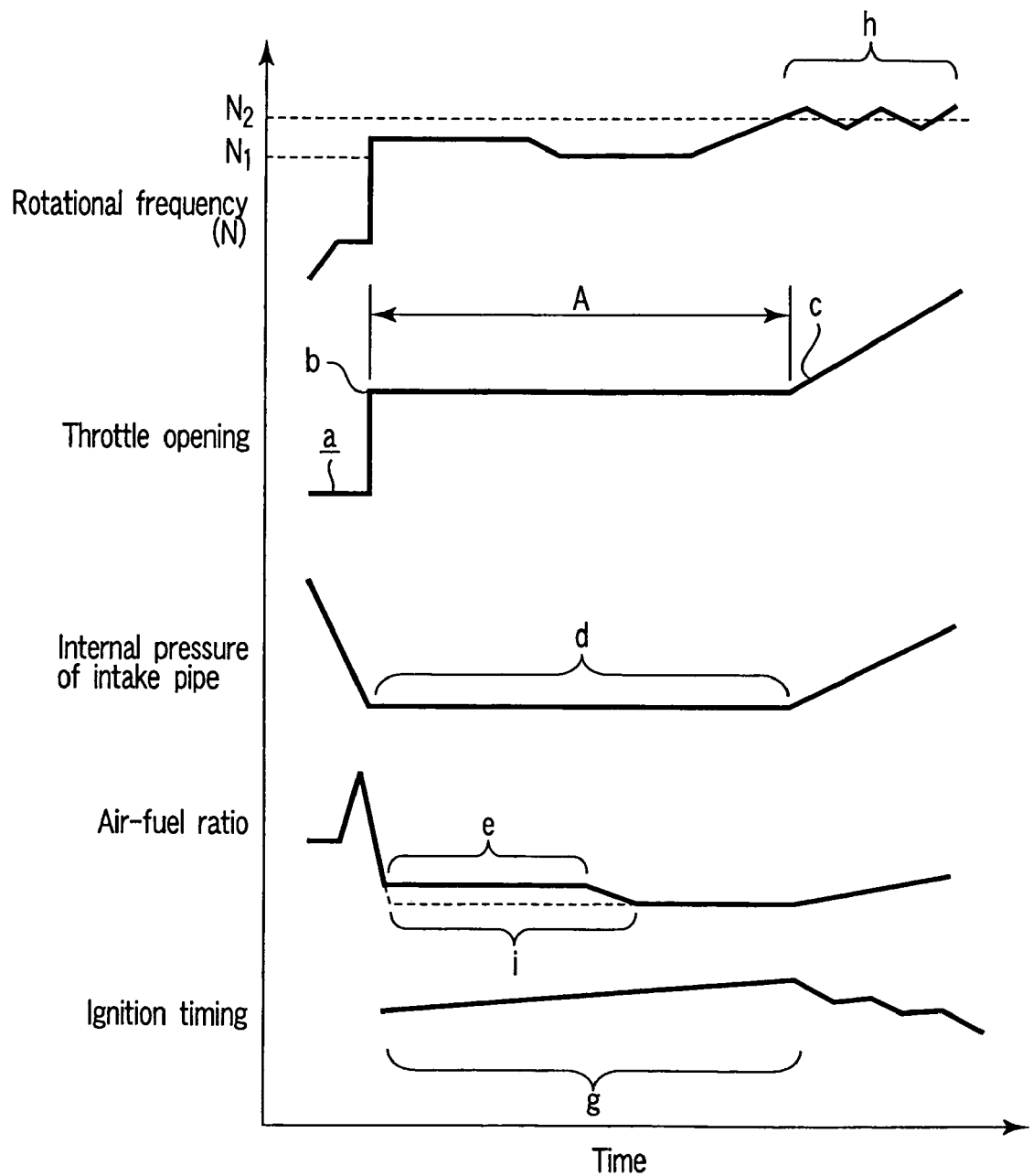
FIG. 3 is a timing chart for illustrating characteristics of the internal combustion engine shown in FIG. 1.

The control of the engine 1 will now be described with reference to the flow chart for control steps ST of FIG. 2 and the timing chart of FIG. 3. FIG. 3 shows characteristic curves for the case where a fuel of relatively low volatility is used.

In Step S1, a start switch of the engine 1 is turned on. In Step S2, the electronic control unit 12 actuates a stepping motor or the like. The electronic control unit 12 sets the electronic throttle valve 4 for a substantially minimal initial opening that is necessary for the start of the engine 1, as indicated by a in FIG. 3.

In Step S3, whether or not the engine 1 is in a cold start mode is checked according to a detection signal from the cooling water temperature sensor 11 by the electronic control unit 12. If it is concluded from a relatively high cooling water temperature that the cold start mode is not active, the control is finished. If it is concluded from a relatively low cooling water temperature that the cold start mode is active, the program advances to Step S4.

Step S4 and Step S6 mentioned later represent an engine speed detection step according to the present invention. In Step S4, whether or not a start decision rotational speed N1 has been exceeded by the rotational speed N of the engine 1 is checked according to a detection signal from the crank angle sensor 10 by the electronic control unit 12. If the start decision rotational speed N1 has not been exceeded by the rotational speed N, the program returns to Step S2.

If the start decision rotational speed N1 for first combustion has been exceeded by the rotational speed N, the program advances to Step S5. In Step S5, the electronic control unit 12 actuates the stepping motor or the like, thereby adjusting the electronic throttle valve 4 to the starting opening of the engine 1, as indicated by b in FIG. 3. Step S5 and Step S8 mentioned later represent an air intake adjustment step according to the present invention.

In Step S6, whether or not the rotational speed N has increased to a target rotational speed N2 or the idling speed of the engine 1 is checked according to a detection signal from the crank angle sensor 10 by the electronic control unit 12. If the rotational speed N has not increased to the target rotational speed N2, the program proceeds to Step S7.

In Step S7, the electronic control unit 12 actuates the ignition timing changing means 15. Thereupon, the ignition timing of the ignition coil for each cylinder is advanced, as indicated by g in FIG. 3, whereby the rotational speed of the engine 1 is urged to increase. Step S7 and Step S9 mentioned later represent an ignition timing changing step according to the present invention.

If it is concluded that in Step S6 that the rotational speed N has increased to the target rotational speed N2, the program advances to Step S8.

In Step S8, the electronic control unit 12 actuates the stepping motor or the like, thereby slightly increasing the opening of the electronic throttle valve 4, as indicated by c in FIG. 3.

In Step S9, therefore, the ignition timing changing means 15 is actuated to retard the ignition timing of the ignition coil for each cylinder, whereby the exhaust gas purifying catalyst 7 is activated early. Steps S8 and S9 may be carried out in reverse order.

Step S10 functions as a control termination step for determining whether or not to terminate the aforesaid start control. Step S10 also has a function of preventing the air intake from excessively increasing and causing variation in combustion. In Step S10, whether or not the ignition timing has been retarded to a given target ignition timing adequate for early activation of the exhaust gas purifying catalyst 7 is checked.

Based on the output of the throttle position sensor 9, moreover, whether or not an upper limit value that is set in accordance with the detected water temperature from the cooling water temperature sensor 11 has been reached by the opening of the electronic throttle valve 4 is checked. The program returns to Step S6 if the ignition timing has not been retarded to the target ignition timing and if the upper limit value has not been reached by the opening of the electronic throttle valve 4.

The upper limit value is set in accordance with the output of the cooling water temperature sensor 11 because the vaporization characteristic of the fuel varies depending on the cooling water temperature. According to this embodiment, the opening of the electronic throttle valve 4 is set so that the lower the water temperature, the lower the upper limit value of the opening is.

If the program proceeds from Step S7 to Step S10, the throttle opening is kept at the starting opening, and the ignition timing is advanced. Thus, the decision of Step S10 is always "NO" and the program returns to Step S6. After Step S7 terminates, therefore, the program may be returned directly to Step S6, as indicated by the broken line 20.

After Step S6 is restored, whether or not the rotational speed N has increased to the target rotational speed N2 is determined again in Step S6. If the fuel of relatively low volatility is used, the rotational speed of the engine 1 cannot increase easily. In some cases, therefore, the rotational speed N may repeat reversal near the target rotational speed N2, as indicated by h in FIG. 3. Even in this case, the ignition timing is retarded only during a period in which the rotational speed N is higher than the target rotational speed N2.

Consequently, the ignition timing is retarded slowly. Even if fuel of relatively low volatility is used, therefore, increase of the rotational speed of the engine 1 can be accelerated as the ignition timing is retarded, so that the catalyst temperature can be increased earlier.

If a regular fuel of good volatility is used, the rotational speed N of the engine 1 is quickly increased by satisfactory combustion of the fuel. Accordingly, the target rotational speed N2 is exceeded early, and the target rotational speed N2 is exceeded continuously. In this case, therefore, the ignition timing is retarded continuously. Thus, compared with the case where fuel of relatively low volatility is used, the ignition timing is retarded more drastically, and the catalyst temperature increase can be hastened.

If it is concluded in Step S10 that the ignition timing has been retarded to the target ignition timing or that the upper limit value has been reached by the opening of the electronic throttle valve 4, the program advances to Step S11. In Step S11, increasing the opening of the electronic throttle valve 4 is stopped, and the opening at that time is maintained. Thereupon, the control according to the present embodiment terminates. If the ignition timing is retarded, the air intake is also increased to secure the output.

If the opening of the electronic throttle valve 4 is excessively enhanced to increase the air intake, the air-fuel ratio overleans, so that the combustion variation increases. According to the present embodiment, therefore, the upper limit value is provided for the opening of the electronic throttle valve 4 in Step S10, whereby the air-fuel ratio is prevented from overleaning.

In connection with the present embodiment, no reference is made to the air-fuel ratio for starting. Overleaning can be prevented more securely by applying the present embodiment to, as another example, an engine in which the air-fuel ratio is leaned out to hasten the catalyst temperature increase at the start of operation, that is, an engine that is provided with starting air-fuel ratio leaning means.

If regular fuel of good volatility is used in the cold start mode of the engine 1, according to the embodiment described above, the rotational speed of the engine 1 rapidly increases as the fuel burns satisfactorily, so that the target rotational speed N2 can be reached. As the opening of the electronic throttle valve 4 is increased, therefore, the internal pressure of the intake pipe 5 on the downstream side of the electronic throttle valve 4 increases. Thereupon, the negative pressure of the intake pipe 5 falls. Since the fuel easily evaporates, however, the air-fuel ratio never overleans, so that the stability of combustion can be ensured. Since the ignition timing of the ignition coil is retarded, moreover, the activation of the exhaust gas purifying catalyst 7 is hastened. Thus, the exhaust gas purifying function of the exhaust gas purifying catalyst 7 can be enhanced.

If fuel of relatively low volatility is used in the cold start mode of the engine 1, on the other hand, satisfactory fuel combustion cannot be achieved with ease. In this case, however, increase of the rotational speed of the engine 1 is accelerated as the ignition timing is advanced. Before the target rotational speed N2 is reached by the rotational speed of the engine 1, moreover, the opening of the electronic throttle valve 4 can kept substantially at the starting opening without being increased in the section indicated by A in FIG. 3. Accordingly, the internal pressure of the intake pipe 5 on the downstream side of the electronic throttle valve 4 is reduced. Thus, the negative pressure in the intake pipe 5 increases, as indicated by d in FIG. 3. If the volatility of the fuel is relatively low, therefore, its vaporization can be accelerated. Consequently, overleaning of the air-fuel ratio of the engine 1 can be avoided. Despite the same fuel injection quantity, therefore, the air-fuel ratio measured in a lean atmosphere becomes relatively rich, as indicated by e in FIG. 3. Thus, the engine 1 burns fuel satisfactorily, and the stability of combustion can be ensured.

In the cold start mode of the engine 1, the opening of the electronic throttle valve 4 is first set to an initial opening that is smaller than the starting opening. Thereupon, the negative pressure in the intake pipe 5 on the downstream side of the electronic throttle valve 4 increases, so that the vaporization of the fuel is accelerated. Thus, the startability of the engine 1 can be enhanced by the satisfactory combustion of the fuel.

If the rotational speed N of the engine 1 is increased to the target rotational speed N2, the ignition timing changing means 15 is actuated to retard the ignition timing of the ignition coil for each cylinder. The air intake is increased by increasing the opening of the electronic throttle valve 4 before retarding the ignition timing. In this way, the combustion stability can be further improved.

As the fuel stably burns in this manner, the rotational speed of the engine 1 reaches the target rotational speed N2. Thereupon, the ignition timing of the ignition coil is retarded, whereby the exhaust gas purifying catalyst 7 is activated early. Thus, the exhaust gas can be further purified.

The present invention is not limited to this embodiment. In the embodiment described above, the ignition timing is advanced if the rotational speed N falls below target rotational speed N2 again after it has increased to the target rotational speed N2. Once the target rotational speed N2 is exceeded by the rotational speed N, for example, however, the advance of the ignition timing afterward may be prohibited or restrained to expedite the activation of the catalyst temperature increase.

The cylinder fuel injection engine has been described in connection with the foregoing embodiment. However, the invention can be also carried out for a intake port fuel injection engine, that is, an engine that is provided with a single or a plurality of fuel injection valves or carburetors in a intake pipe on the downstream side of an electronic throttle valve.

In the embodiments described above, the air intake is adjusted in accordance with the opening of the throttle valve itself. In, as another example, an engine that has a main intake passage provided with the throttle valve, a bypass connected in parallel with the main intake passage, and a conventional idle speed control valve in the bypass, however, the air intake may be adjusted by varying the opening of the idle speed control valve. These modifications can share the same functions and effects with the embodiments described above.

The present invention is applicable to internal combustion engines, including automotive internal combustion engines, which require early activation of an exhaust gas purifying catalyst in a cold start mode and improved fuel combustibility.

What is claimed is:

1. A start control device for an internal combustion engine having an exhaust gas purifying catalyst, comprising engine rotational speed detecting means, ignition timing changing means, a valve mechanism which is set in a intake pipe and adjusts an air intake, and control means,
wherein the control means sets a valve opening of the valve mechanism to a starting opening in a cold start mode of the engine when the engine rotational speed detected by the engine rotational-speed detecting means increases above a start decision rotational speed, then maintains the valve opening until the engine rotational speed detected by the engine rotational-speed detecting means increases to a target rotational speed after an ignition timing is advanced by the ignition timing changing means, and increases the valve opening and causes the ignition timing changing means to retard an ignition timing when the engine rotational speed becomes higher than the target rotational speed.

2. A start control device for an internal combustion engine according to claim 1, wherein the control means causes the ignition timing changing means to retard the ignition timing only during a period in which the rotational speed is increased above the target rotational speed.

3. A start control device for an internal combustion engine according to claim 1, wherein the control means causes the ignition timing changing means to retard the ignition timing after increasing the valve opening if the engine rotational speed is increased above the target rotational speed in the cold start mode of the engine.

4. A start control device for an internal combustion engine according to claim 1, wherein the control means first sets the valve opening to an initial opening in the cold start mode of the engine and then increases the valve opening to the starting opening.

5. A start control device for an internal combustion engine according to claim 3, wherein the control means first sets the valve opening to an initial opening in the cold start mode of the engine and then increases the valve opening to the starting opening if the engine rotational speed is increased above a start decision rotational speed.

6. A start control device for an internal combustion engine according to claim 1, wherein the control means is provided with starting air-fuel ratio leaning means which leans out an air-fuel ratio at the start of operation of the engine.

7. A start control method for an internal combustion engine having an exhaust gas purifying catalyst, comprising control steps including an engine rotational speed detecting step of detecting a rotational speed of the engine, an ignition timing changing step of changing an ignition timing, and an air intake adjustment step of adjusting an air intake by means of a valve mechanism set in a intake pipe,
the control steps include setting a valve opening of the valve mechanism to a starting opening in a cold start mode of the engine in the air intake adjustment step when the engine rotational speed detected in the engine rotational speed detecting step increases above a start decision rotational speed, then maintaining the valve opening until the engine rotational speed detected in the engine rotational speed detecting step increases to a target rotational speed after the ignition timing is advanced in the ignition timing changing step, and increasing the valve opening and retarding the ignition timing in the air intake adjustment step and the ignition timing changing step, respectively, when the engine rotational speed becomes higher than the target rotational speed.

8. A start control method for an internal combustion engine according to claim 7, wherein the control steps include retarding the ignition timing in the ignition timing changing step only during a period in which the rotational speed is increased above the target rotational speed.

9. A start control method for an internal combustion engine according to claim 7, wherein the control steps include retarding the ignition timing in the ignition timing changing step after increasing the valve opening in the air intake adjustment step if the engine rotational speed is increased above the target rotational speed in the cold start mode of the engine.

10. A start control method for an internal combustion engine according to claim 7, wherein the control steps include first setting the valve opening to an initial opening in the cold start mode of the engine in the air intake adjustment step and then increasing the valve opening to the starting opening.

11. A start control method for an internal combustion engine according to claim 9, wherein the control steps include first setting the valve opening to an initial opening in the cold start mode of the engine in the air intake adjustment step and then increasing the valve opening to the starting opening in the air intake adjustment step if the engine rotational speed is increased above a start decision rotational speed.

12. A start control method for an internal combustion engine according to claim 7, wherein the control steps include a starting air-fuel ratio leaning means step of leaning out an air-fuel ratio at the start of operation of the engine.

* * * * *